United States Patent
Chadha et al.

(10) Patent No.: US 9,697,034 B2
(45) Date of Patent: *Jul. 4, 2017

(54) OFFLOADING PROBABILISTIC COMPUTATIONS IN DATA ANALYTICS APPLICATIONS

(71) Applicant: Futurewei Technologies, Inc., Plano, TX (US)

(72) Inventors: Vineet Chadha, San Jose, CA (US); Gopinath Palani, Sunnyvale, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/821,320

(22) Filed: Aug. 7, 2015

(65) Prior Publication Data

US 2017/0039080 A1 Feb. 9, 2017

(51) Int. Cl.
 G06F 9/455 (2006.01)
 G06F 17/30 (2006.01)
 H04L 29/08 (2006.01)

(52) U.S. Cl.
 CPC .... *G06F 9/45558* (2013.01); *G06F 17/30203* (2013.01); *G06F 17/30233* (2013.01); *H04L 67/1097* (2013.01); *G06F 2009/45583* (2013.01); *G06F 2009/45595* (2013.01)

(58) Field of Classification Search
 None
 See application file for complete search history.

(56) References Cited

U.S. PATENT DOCUMENTS

| | | | |
|---|---|---|---|
| 7,003,507 B2 * | 2/2006 | Tip | G06F 9/443 |
| 7,318,229 B1 * | 1/2008 | Connor | G06F 9/443 |
| | | | 714/25 |
| 7,475,199 B1 * | 1/2009 | Bobbitt | G06F 17/30079 |
| | | | 707/999.202 |

(Continued)

FOREIGN PATENT DOCUMENTS

| | | |
|---|---|---|
| CN | 102109997 | 6/2011 |
| CN | 103595720 | 2/2014 |
| WO | WO-2014110137 | 7/2014 |

OTHER PUBLICATIONS

"International Application No. PCT/CN2016/091776, International Search Report mailed Dec. 14, 2016", (Dec. 14, 2016), 4 pgs.

*Primary Examiner* — Gregory A Kessler
(74) *Attorney, Agent, or Firm* — Schwegman Lundberg & Woessner, P.A.

(57) ABSTRACT

An approach to offloading probabilistic computations is described. An application server comprising a memory and a processor and coupled to a network-attached storage device configured to create a dedicated process in response to a procedural call to a virtual machine container based on a data request is disclosed. The processor forwards the data request to the network-attached storage device, programs one or more virtual machines to perform a probabilistic computation based on the procedural call, and directs the probabilistic computation to a first virtual machine of the one or more virtual machines. The request for data is transformed into a modified call using a virtualized lookup call.

20 Claims, 4 Drawing Sheets

(56) References Cited

U.S. PATENT DOCUMENTS

| | | | |
|---|---|---|---|
| 8,775,358 B2* | 7/2014 | Bonawitz | G06N 7/005 706/52 |
| 8,782,161 B2 | 7/2014 | Sugumar et al. | |
| 2011/0161495 A1 | 6/2011 | Ratering et al. | |
| 2013/0191827 A1* | 7/2013 | Ashok | G06F 9/5016 718/1 |
| 2014/0181804 A1 | 6/2014 | Sakata et al. | |

* cited by examiner

OFFLOADING PROBABILISTIC COMPUTATIONS IN DATA ANALYTICS APPLICATIONS

FIELD

Embodiments of the present invention generally relate to the field of analytic computations. More specifically, embodiments of the present invention relate to distributed probabilistic computations.

BACKGROUND

Many data analytics applications (e.g., recommendation engines) require probabilistic computations through specialized probabilistic data structures (e.g., bloom filtering, linear counting, Log Log algorithms, element cardinality, count-min algorithms) based on very large amounts of data. This typically requires fetching large quantities of data from one or more storage servers and transmitting the data to a computational node for processing. Currently there are no viable solutions to offload and execute probabilistic based computations on distributed file storage servers (e.g., NFS/CIFS servers). Some approaches cause a large increase in network usage, NAS-side CPU usage, memory usage, and NIC usage for transferring raw data to the node for processing. Other drawbacks include data fetching latency and the consumption of application server resources during computation.

Very large data sets are common in the web domain or the data analytics domain. Many models are used to process large scale data such as MapReduce. An example of such large scale data processing is the Hadoop ecosystem which is based on querying large data sets for analytics. For such large scale data, memory resources are often a limiting factor. Various algorithms have been explored which attempt a compromise between the amount of memory used and the precision required. Because analytics require an estimate of the result of a query, a variance in the expected values is tolerable and safe if based on the computation model used to calculate the value.

SUMMARY

An approach to offloading probabilistic computations is realized through lightweight (e.g., low overhead) VMs at the storage end. This approach is enabled through the extended distributed protocol by embedding probabilistic operations (e.g., semantics), along with pointers to data on the storage device. A storage controller performs multiple functions, including deduplication, provisioning, replication, and tiering. Probabilistic algorithms (e.g., classification, clustering and collaborative filtering) may be embedded into the traditional protocols (NFS & CIFS) with the defined extensions. A translator or parser is used to convert the expression (operations) into C objects. Each operation is executed in a containers which provide sandboxing environment (VMs or process level VMs like zeroVM). Different Operations are pipelined, where output of each operations is input to next operation.

In one embodiment, an apparatus for offloading a probabilistic computation to a storage device, is described. The apparatus includes an application server comprising a memory and a processor and coupled to a network-attached storage device configured to create a dedicated process in response to a procedural call to a virtual machine container based on a data request. The processor forwards the data request to the network-attached storage device, programs one or more virtual machines to perform a probabilistic computation based on the procedural call, and directs the probabilistic computation to a first virtual machine of the one or more virtual machines. The request for data is transformed into a modified call using a virtualized lookup call.

In another embodiment, a method for offloading a computation to a storage device is disclosed. The method includes registering a process identifier with a processor using a user-level application to establish a channel of communication with the processor and fork an output of a virtual machine to create a new process, transforming a request for data into a modified call using a virtualized lookup call, forwarding the modified call to the user-level application using a virtualized NFS procedural call and the channel of communication, creating an inter-process communication channel between a kernel address space of the processor and a user address space, and using the communication channel to forward an NFS call to the virtual machine to perform the probabilistic computation.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Embodiments are well suited to performing various other steps or variations of the steps recited in the flowchart of the figures herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a cellular antenna array. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer, network device, or other electronic computing device that manipulates and transforms data represented as physical (electronic) quantities within the system's registers and memories into other data similarly represented as physical quantities within the system memories or registers or other such information storage, transmission or display devices.

Offloading Probabilistic Computations in Data Analytics Applications

As storage operation costs become cheaper, offloading large scale computations to be performed at the storage appliance side (rather than fetching the data into a computing node's memory to perform the computations) has become more feasible. Performing probabilistic computations at the storage appliance side may reduce or eliminate network usage, NAS-side CPU utilization, memory usage, and NIC usage necessary for transferring raw data from one or more file servers to a computational node for processing. A methodology to compute the probabilistic computation at a distributed node using a modified application API is disclosed herein.

To perform probabilistic computation on a large set of integers, for example, raw data needs can be represented in a form suitable to query for data analytics. An example query would attempt to determine the top k most frequent elements. However, to maintain state information about millions of integers would require a significant amount of memory. Instead, approximate data structures may be used for the analysis. Count-min is an example of a probabilistic data structure used to compute the top k elements stored in data sets. Note that it may require multiple hashing to store and enable querying the state of data sets. The results are often governed by the number of elements and distinct elements in the data sets. Similarly, another example of a probabilistic data structure is a bloom filter. A bloom filter tracks the state of items through bitsets using several independent hash functions. An example application use-case is a recommendation engine used in popular social networking websites where bloom filtering is used to eliminate a number of candidate items.

Probabilistic computation of the data sets using light weight virtualization is described herein. In one approach, the query is transferred over a distributed file system protocol and initiates probabilistic computation on preconfigured virtual machines ("VMs") specialized to execute a probabilistic computation algorithm. The VMs are configured to receive the input from the input channel, execute the probabilistic algorithm, and send results through the output channel. Such an approach also allows forking (e.g., creating a new processor) or distributing computations among multiple VMs to execute the different algorithms (e.g., parallel computing) to improve the performance and/or accuracy of the computations. Furthermore, the described approach is scalable due to the fact that more or less VMs may be utilized depending on the circumstances.

Typically, data analytics (or machine learning based analytics) go through multiple phases (e.g., classification, clustering and collaborative filtering). Classification attempts to categorize the information based on certain characteristics. Clustering is performed to find objects of similar characteristics or to determine overlap of the object. Collaborative filtering is a technique often used to filter out objects based on multiple data sources. Each phase may have its own computational requirements, and classifying very large sets of data (e.g., petabytes of data) may require a great amount of processing power.

The approach of probabilistic computation is realized through lightweight (e.g., low overhead) VMs at the storage end. This approach is enabled through the extended distributed protocol by embedding probabilistic operations (e.g., semantics), along with pointers to data on the storage device. A storage controller performs multiple functions, including deduplication, provisioning, replication, and tiering.

Figure 1:
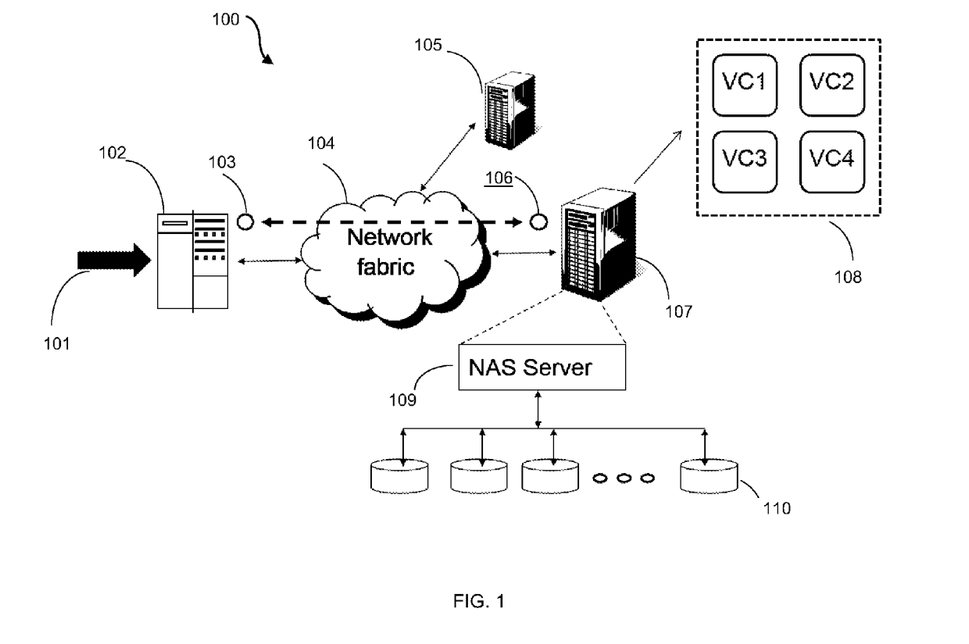
FIG. 1 is a block diagram depicting an exemplary system architecture according to embodiments of the present disclosure.

With regard to FIG. 1, an exemplary system architecture 100 is depicted according to some embodiments of the present invention. An incoming client request 101 is received at application server 102. Application server 102 executes an NFS/CIFS Client application 103 and is coupled to network-attached storage (NAS) device 105 and NAS Device 107 over network fabric 104. NAS Device 107 includes an NAS Server 109 having one or more storage devices 110 and maintains a lightweight virtualization environment 108. As depicted in FIG. 1, virtualization environment 108 has a plurality of virtual machines (e.g., VC1, VC2, VC3 and VC4).

Probabilistic algorithms (e.g., classification, clustering and collaborative filtering) may be embedded into the traditional protocols (NFS & CIFS) with the "prob_XXX" extensions. A translator or parser is used to convert the expression (operations) into C objects. Each operation is executed in a container which provides a sandboxing environment (VMs or process level VMs like zeroVM). Different Operations are pipelined, where output of each operation is input to next operation. For example, five different operations may be performed:

TABLE I

Figure 2:
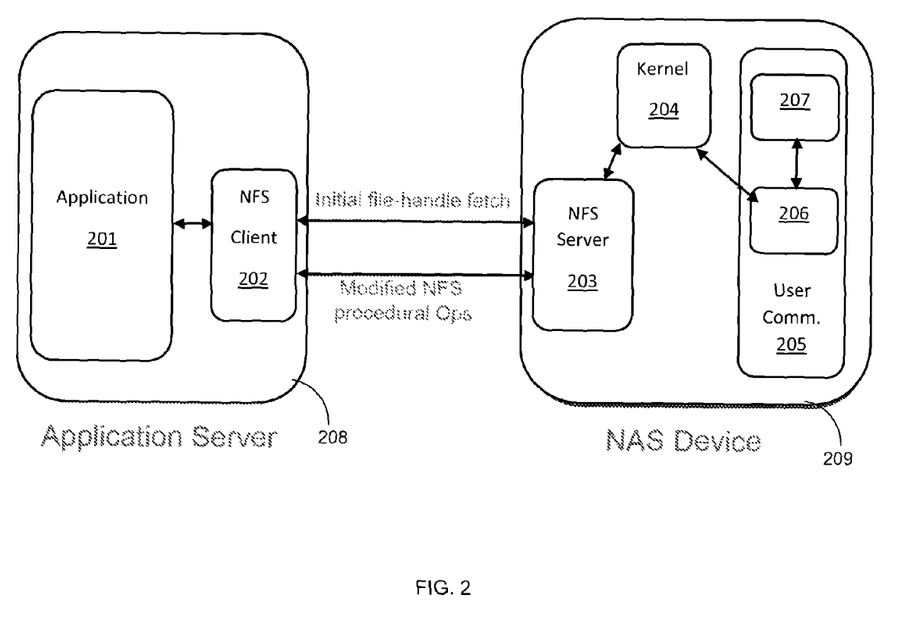
FIG. 2 is a block diagram depicting an exemplary configuration for offloading an operation from an application server according to embodiments of the present disclosure.

Op1 - Read graph from FileA
Op2 - Read graph from FileB
Op3 - Perform Collaborative Filtering
Ope4 - Perform count-min algorithm on output of Op3
Op5 - Save the result model to FileC With regard to FIG. 2, an exemplary configuration for offloading an operation from an application server is depicted according to some embodiments of the present invention. Application 201 is executed by Application Server 208 and a procedural call is offloaded using NFS Client 202. NAS Device 209 executing NFS Server 203 receives an initial file-handle fetch as well as modified NFS procedural operations. The NFS Server 203 is coupled to kernel communication module 204. Kernel communication module 204 may be executed on a general purpose processor or a network processor, for example. Kernel communications module 204 is configured to provide indirection of a modified RPC call to the user level VM container. User communications module 205 has a user level application thread 206 configured to receive the request parameter from the kernel to configure the sandbox environment. A user program registers a process ID ("PID") to the kernel to establish the channel of communication with the kernel. Application execution inside the storage components can be applied with template 207 to change the behavior of storage containers based on configuration parameters.

NFS Protocol and Configuration

Network file system is a network protocol based on remote procedural calls ("RPC"). The NFS protocol divides a remote file into blocks of equal size and supports on-demand, block-based transfer of file contents. Multiple procedural calls are defined for NFS protocol such as read, lookup, readdir, remove, etc. Although other file system protocols may be used with the present invention, NFS is a preferred protocol due to its use of remote procedural calls ("RPC").

In context of the NFS protocol, file or dir objects are addressed using opaque file handles. Any read call is preceded with a lookup to locate the file object to be read. Then the read call is invoked iteratively, where the number of iterations is based on the NFS configuration and file size to be fetched. With the ongoing trend of increasing file sizes, often referred to as Big Data, and with new workloads emerging in the field, certain operations (e.g., a read operation over a distributed file system) have become very resource intensive. For large scale data, a join operation may be seamlessly executed on the backend device and return results to the application in server address space in many cases. Embedding the operation (e.g., the logic or semantics) behind the fetching of data from the backend device into the traditional distributed protocol may reduce or eliminate the cost of fetching large scale data into the server.

Process Level Virtual Machine

Process level VMs are generally used to provide either a sandboxed environment for a group of processes to execute securely or to provide platform independence to user applications. Process level virtual machines are a prominent component of virtualized containers such as OpenVZ and Linux container (LXC). One aspect of the present invention provides specialized stacks for application execution. One such approach of providing specialized stacks for the operating system is called Exokernel (also known as libOS). Exokernel reduces the abstraction typically offered by monolithic operating systems ("O/S"). O/S Functionality is exported at the user level and an application may be linked dynamically with specialized O/S runtimes and specialized device drivers to reduce or eliminate the overhead incurred in a traditional operating system. Typically libOS provides interfaces such as process management, paging, file system, and system call interfaces. With advent of Big Data, it is highly beneficial to move the data closer to the storage components. For example, converged storage with processing and storage controller on the same dies or very close may eliminate bus latency or network latency through offloading computational tasks to the storage components.

An example of lightweight virtualization based on libOS principals is ZeroVM. ZeroVM enables isolation of a single process or task into separate containers. The approach allows for the isolation (e.g., sandboxing) of essential tasks only rather than the complete software stack. Application execution inside the storage components can be applied with a template manifest to change the behavior of storage containers based on configuration parameters. Typically, various abstraction layers are added on the top of storage appliance to provide customized services for client requests. Linux LUN or volume, for example, may be used to provide the abstraction of capacity. There are also storage appliance specialized for virtualization.

Multiple categories may be used for the template containers for deployment of process level VM on the storage side, such as capacity, throughput, virtualization and functional transformation. According to some embodiments of the present invention, lightweight virtualization based on ZeroVM approach is used because the Google (for example) native client is a well-tested approach to providing secured execution for an application and the hypervisor takes less memory to execute the VMs.

Probabilistic Computation Offloading

The User Application API may be modified to include the probabilistic operation of new proposed NFS procedural call prob-lookup. A prob-lookup call invokes a lookup over multiple files, and a probabilistic operation is invoked on top of those file reads in a secured environment (process levelVM). It is an iterative procedural call which involves looking up the file name, invoking read, and finally applying probabilistic operation computation (e.g., count-min, bloom filter, linear counting, Log Log counting algorithm, etc.) on the top of it. A system call carries semantics information and a list of files to NFS prob-lookup procedural call. A probabilistic operation may be defined as:

```
Struct prob_op {
    String algorithm_type;
    int condition; //operation flags
} op_prob;
```

Note that the client and the server are synchronized regarding the probabilistic computation that is feasible at the storage end. A hypervisor can redirect the computation to preconfigured VMs with probabilistic algorithms listening for a request from the client.

Figure 3:
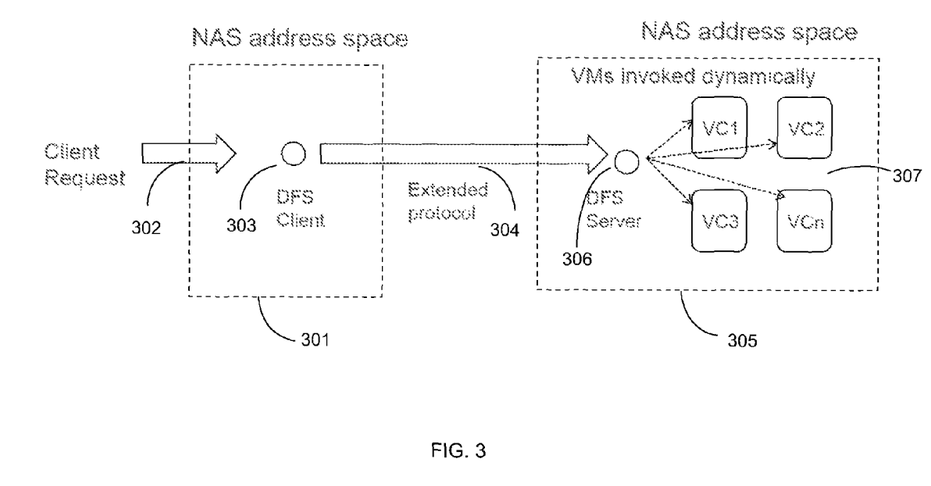
FIG. 3 is a block diagram depicting an exemplary probabilistic computation according to embodiments of the present disclosure.

With regard to FIG. 3, an exemplary probabilistic computation is depicted according to some embodiments of the present invention. As depicted, the implementation features DFS Client 303 and DFS Server 306. An incoming client 302 request is received by DFS Client 303 in a first NAS address space 301. The request is forwarded over extended protocol 304 to DFS Server 306 having a second NAS address space 305. Each VM in virtual machine environment 307 (e.g. VC1, VC2, VC3 and VCn) may be invoked dynamically. According to some embodiments, each VM is configured to execute different probabilistic algorithms (e.g., count-min, Log Log, bloom filter). A bloom filter may use a space efficient probabilistic data structure. Multiple hashing functions are applied to each element and state data is maintained. A bloom filter is useful for membership queries. A count-min operation is efficient for frequency estimation to determine the top k elements in large data sets, for example.

The NFS/CIFS protocol may be modified to support execution of probabilistic based algorithms by adding the following primitives:

TABLE II prob_compute("expr");
    Input (expr) = graph or data file to read data long with operation type (classification, clustering collaborative filtering)
    Output = data model or status
prob_compute_save("expr","filename");
    Input (expr) = graph or data file to read data long with operation type (classification, clustering collaborative filtering)
    Input (filename) = data filename to store the result.
    output = status
prob_from("filename");
    used in conjunction with prob_compute and prob_compute_save to load multidimensional array (each dimension represents one series of events) from a data file
    Input = filename
    Output = multidimensional array
prob_classify("filename-X", "filename-y");
    used for categorizing the information based on its characteristics and generate a model
    Input = filename-X source data file
    Input = filename-y characteristic element data file
    Output = trained model
prob_clustering("filename-X", "filename-y");
    clusters objects of similar characteristics
    Input = filename-X source data file
    Output = 2- dimensional array ( data id and cluster ID )
prob_collabfilter("filename-X", "filename-y");
    filters out data based on multiple data sources
    Input = filename-X source data file
    Input = filename-y characteristic source data file
    Output = 2- dimensional array User-Kernel Communication Module A kernel module is configured to provide indirection of a modified RPC call to the user level zeroVM container. The container is configured to run the offloaded operation with input/output parameters and a system configuration file. The kernel module creates an inter-process communication ("IPC") channel between the kernel address space and user address space to forward the NFS call to a virtual machine and/or secured container. A user level application thread is configured to receive the request parameter from the kernel to configure the sandbox environment. A user program registers a process ID to the kernel to establish the channel of communication with kernel.

ZeroVM Lightweight Virtualization

According to some embodiments of the present invention, ZeroVM cloud hypervisor is used to run offloaded probabilistic operation. ZeroVM is a process level sandbox which allows execution of a single task in a secured environment. ZeroVM features include: restricted memory access for applications; the ability to run foreign compiled source code; and system call restrictions. Abstraction is limited such that a very small surface is exposed to the threat of attack. For communication, ZeroVM has multiple channels (e.g. random read and seq write). VMs in ZeroVM may be forked through configuration file that stores the representative parameter to bootstrap a secured environment. These parameters are dynamically configured by a user level application module when a modified RPC call is invoked with embedded semantics.

Figure 4:
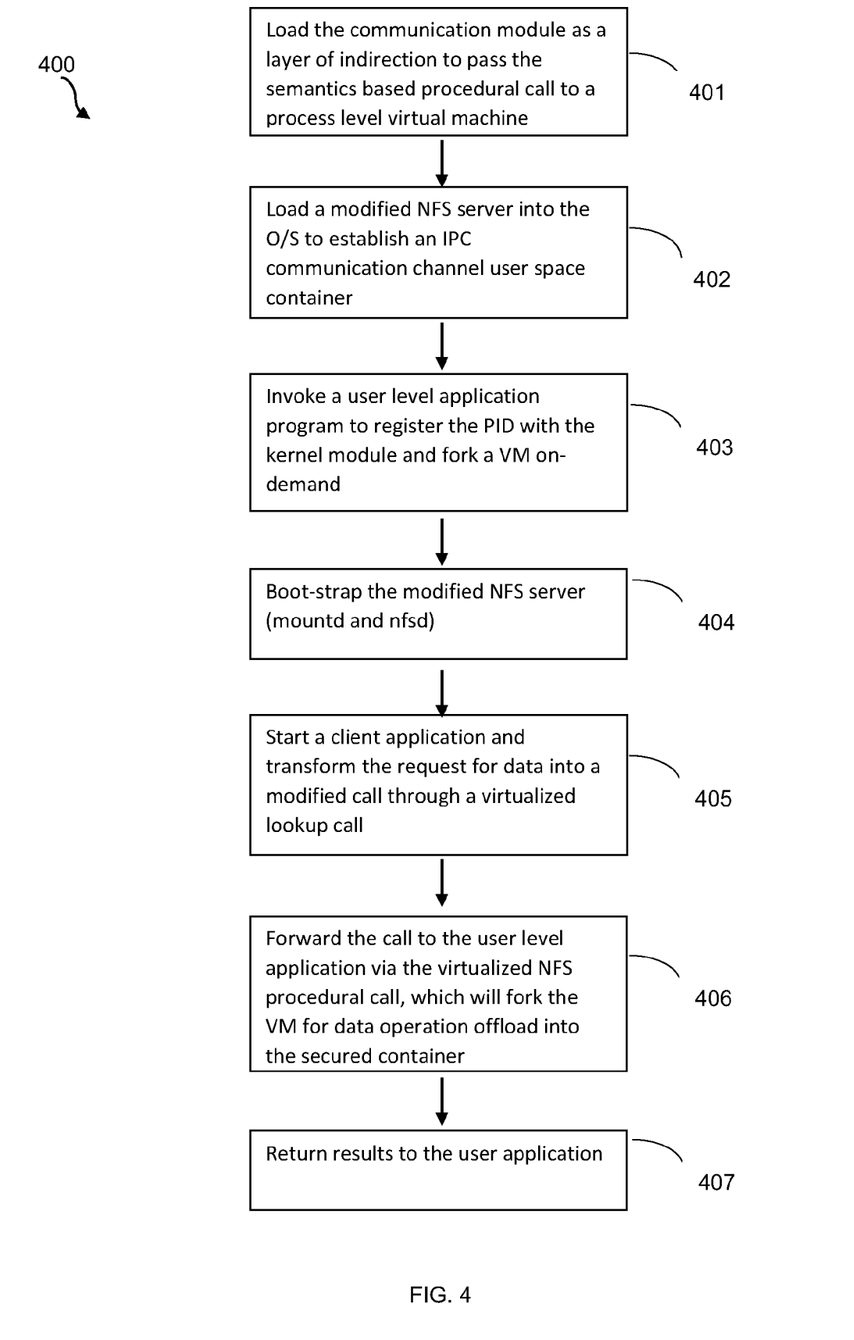
FIG. 4 is a flowchart depicting an exemplary computer implemented sequence of steps for integrating the VM at the storage end with the application server, according to some embodiments of the present disclosure.

With regard to FIG. 4, an exemplary sequence of steps for integrating the VM at the storage end with the application server, where offloading is performed through kernel-user indirection, is depicted according to embodiments of the present invention. Alternatively, the approach could employ user level indirection. As depicted in flow chart 400, the following exemplary sequence of events may occur during offloading and deployment. At step 401, the communication module is loaded as a layer of indirection to pass the semantics-based procedural call to a process level virtual machine. A modified NFS server is loaded into the O/S to establish an IPC communication channel user space container at step 402. A user level application program is invoked to register the PID with the kernel module and may also fork a VM on-demand at step 403. The process continues at step 404, where the modified NFS server (mountd and nfsd) is boot-strapped. At step 405, a client application is started and the request for data is transformed into a modified call through a virtualized lookup call. At step 406, a virtualized NFS procedural call is used to forward the modified call to the user level application which may also fork the VM for data operation offloaded into the secured container. The results are sent back to the user application at step 407.

Embodiments of the present invention are thus described. While the present invention has been described in particular embodiments, it should be appreciated that the present invention should not be construed as limited by such embodiments, but rather construed according to the following claims.

What is claimed is:

1. An apparatus for offloading a probabilistic computation to a storage device, the apparatus comprising:
    an application server comprising a memory and a processor and coupled to a network-attached storage device configured to create a dedicated process in response to a procedural call configured to invoke a probabilistic operation to a virtual machine container based on a data request,
    wherein the processor forwards the data request to the network-attached storage device, programs one or more virtual machines to perform a probabilistic computation based on the procedural call, and directs the probabilistic computation to a first virtual machine of the one or more virtual machines, and the procedural call is generated using a virtualized lookup call.

2. The apparatus of claim 1, wherein the processor registers a process identifier of a user program to establish a channel of communication between the user program and the network-attached storage device.

3. The apparatus of claim 1, wherein the processor changes a behavior of one or more storage containers of the one or more virtual machines using a template.

4. The apparatus of claim 1, wherein at least one of the virtual machines is configured to execute a probabilistic algorithm.

5. The apparatus of claim 1, wherein at least one of the virtual machines performs a Log Log counting operation.

6. The apparatus of claim 1, wherein at least one of the virtual machines performs a membership test.

7. The apparatus of claim 1, wherein at least one of the virtual machines performs a bloom filter operation.

8. In a computer storage system, a method for offloading a probabilistic computation to a storage device, the method comprising:
    registering a process identifier with a processor using a user-level application to establish a channel of communication with the processor;
    transforming a request for data into a modified call configured to invoke a probabilistic operation using a virtualized lookup call;

forwarding the modified call to the user-level application using a virtualized NFS procedural call and the channel of communication;

creating an inter-process communication channel between a kernel address space of the processor and a user address space; and using the inter-process communication channel to forward an NFS call to a virtual machine to perform the probabilistic computation.

9. The method of claim 8, further comprising passing the probabilistic computation to a secured container of the virtual machine.

10. The method of claim 9, wherein the secured container provides a sandbox environment for executing the probabilistic computation.

11. The method of claim 8, further comprising forking an output of the virtual machine to create a new process.

12. The method of claim 11, wherein the new process is executed by a second virtual machine.

13. The method of claim 8, wherein the virtual machine is configured to perform a Log Log counting operation.

14. The method of claim 8, wherein the virtual machine is configured to perform a membership test.

15. The method of claim 8, wherein the virtual machine is configured to perform a bloom filter operation.

16. A computer program product tangibly embodied in a computer-readable storage device and comprising instructions that when executed by a processor perform a method for offloading a probabilistic computation to a storage device, the method comprising:

registering a process identifier with a first processor using a user-level application to establish a channel of communication with the first processor and fork an output of a virtual machine to create a new process;

transforming a request for data into a modified call configured to invoke a probabilistic operation using a virtualized lookup call;

forwarding the modified call to the user-level application using a virtualized NFS procedural call and the channel of communication;

creating an inter-process communication channel between a kernel address space of the first processor and a user address space; and using the inter-process communication channel to forward an NFS call to the virtual machine to perform the probabilistic computation.

17. The method of claim 16, further comprising passing the probabilistic computation to a secured container of the virtual machine.

18. The method of claim 17, wherein the probabilistic computation is passed to the secured container as a remote procedural call.

19. The method of claim 17, wherein the secured container provides a sandbox environment for executing the probabilistic computation.

20. The method of claim 17, wherein the virtual machine is configured to perform a membership test.

* * * * *

UNITED STATES PATENT AND TRADEMARK OFFICE
CERTIFICATE OF CORRECTION

PATENT NO. : 9,697,034 B2
APPLICATION NO. : 14/821320
DATED : July 4, 2017
INVENTOR(S) : Chadha et al.

Page 1 of 1

It is certified that error appears in the above-identified patent and that said Letters Patent is hereby corrected as shown below:

In the Specification

In Column 1, Line 17, delete "Log Log" and insert --LogLog-- therefor

In Column 4, Line 62, delete "Ope4" and insert --Op4-- therefor

In Column 6, Line 30-31, delete "levelVM)." and insert --level VM).-- therefor

In Column 6, Line 34, delete "Log Log" and insert --LogLog-- therefor

In Column 6, Line 61, delete "Log Log," and insert --LogLog,-- therefor

In Column 7, Line 10, delete "prob_compute_save("expr","filename");" and insert --prob_compute_save("expr", "filename");-- therefor In the Claims In Column 8, Line 54, in Claim 5, delete "Log Log" and insert --LogLog-- therefor In Column 9, Line 20, in Claim 13, delete "Log Log" and insert --LogLog-- therefor Signed and Sealed this
Twenty-fifth Day of June, 2019

Andrei Iancu
*Director of the United States Patent and Trademark Office*